US012808606B2

(12) United States Patent
Suzuki et al.

(10) Patent No.: US 12,808,606 B2
(45) Date of Patent: Nov. 24, 2026

(54) HEAT TRANSPORT DEVICE AND METHOD FOR MANUFACTURING SAME

(71) Applicant: WELCON INC., Niigata (JP)

(72) Inventors: Yutaka Suzuki, Niigata (JP); Takashi Saito, Niigata (JP); Shingo Ikarashi, Niigata (JP)

(73) Assignee: WELCON INC. (JP)

( * ) Notice: Subject to any disclaimer, the term of this patent is extended or adjusted under 35 U.S.C. 154(b) by 230 days.

(21) Appl. No.: 18/767,149

(22) Filed: Jul. 9, 2024

(65) Prior Publication Data

US 2024/0361081 A1 Oct. 31, 2024

Related U.S. Application Data

(62) Division of application No. 17/253,576, filed as application No. PCT/JP2018/024383 on Jun. 27, 2018, now Pat. No. 12,061,053.

(51) Int. Cl.
*F28D 9/00* (2006.01)
*B21D 53/04* (2006.01)
(Continued)

(52) U.S. Cl.
CPC .......... *F28D 9/0037* (2013.01); *B21D 53/04* (2013.01); *B23P 15/26* (2013.01); *F28D 9/0025* (2013.01);
(Continued)

(58) Field of Classification Search
CPC ............... B23P 15/26; Y10T 29/49366; Y10T 29/49393; B21D 53/04; B23K 2101/14;
(Continued)

(56) References Cited

U.S. PATENT DOCUMENTS 1,662,870 A 3/1928 Stancliffe
3,473,604 A 10/1969 Tiefenbacher
(Continued)

FOREIGN PATENT DOCUMENTS

CN 101669006 A 3/2010
CN 201569352 U 9/2010
(Continued)

OTHER PUBLICATIONS

International Search Report (English & Japanese) and Written Opinion (in Japanese) of the International Searching Authority issued in PCT/JP2018/024383, mailed Sep. 25, 2018; ISA/JP.
(Continued)

*Primary Examiner* — Matthew P Travers
(74) *Attorney, Agent, or Firm* — Harness, Dickey & Pierce, P.L.C.

(57) ABSTRACT

A heat transport device comprises first flow passages through which a first fluid flows, and second flow passages through which a second fluid flows, wherein a cross-section A satisfies the following requirements: the cross-section A is a cross-section perpendicular to the second flow passages; the holes of the second flow passages are disposed so as to be aligned in the left-right direction and to form layers in the up-down direction, and when comparing layers with holes adjacent in the up-down direction, the holes of the second flow passages are not disposed at the same position in the left-right direction; and the first flow passages exist between the layers with holes adjacent in the up-down direction, and the first flow passages meander in the up-down direction so as to avoid the holes of the second flow passages in the layers with holes that are sandwiched in the up-down direction.

5 Claims, 17 Drawing Sheets

(51) Int. Cl.

| | |
|---|---|
| ***B23K 101/14*** | (2006.01) |
| ***B23P 15/26*** | (2006.01) |
| ***F28D 9/02*** | (2006.01) |
| ***F28F 3/02*** | (2006.01) |
| ***F28F 3/08*** | (2006.01) |
| ***F28F 7/02*** | (2006.01) |

(52) U.S. Cl.

CPC ............ *F28D 9/0081* (2013.01); *F28D 9/02* (2013.01); *F28F 3/025* (2013.01); *F28F 3/086* (2013.01); *F28F 7/02* (2013.01); *B23K 2101/14* (2018.08); *F28F 2250/106* (2013.01); *F28F 2255/08* (2013.01); *F28F 2275/061* (2013.01)

(58) Field of Classification Search

CPC .... F28D 9/0025; F28D 9/0037; F28D 9/0081; F28D 9/02; F28F 3/025; F28F 3/046; F28F 3/08; F28F 3/086; F28F 7/02; F28F 2250/106; F28F 2255/00; F28F 2255/08; F28F 2275/061

See application file for complete search history.

(56) References Cited

U.S. PATENT DOCUMENTS

| | | | | |
|---|---|---|---|---|
| 4,153,501 | A | 5/1979 | Fink et al. | |
| 4,235,281 | A | 11/1980 | Fitch et al. | |
| 4,293,033 | A | 10/1981 | Nasser | |
| 5,249,359 | A | 10/1993 | Schubert et al. | |
| 2006/0237178 | A1 | 10/2006 | Katoh et al. | |
| 2008/0149299 | A1 | 6/2008 | Slaughter | |
| 2011/0146961 | A1 | 6/2011 | Imai et al. | |
| 2012/0037349 | A1 | 2/2012 | Takada et al. | |
| 2012/0043064 | A1* | 2/2012 | Takada .................... | F28F 3/025 165/166 |
| 2016/0107274 | A1 | 4/2016 | Rigal et al. | |
| 2017/0067700 | A1 | 3/2017 | Sugama et al. | |
| 2017/0157723 | A1* | 6/2017 | Moro-Le-Gall ...... | F28D 9/0037 |
| 2021/0270545 | A1 | 9/2021 | Suzuki et al. | |

FOREIGN PATENT DOCUMENTS

| | | | | |
|---|---|---|---|---|
| CN | 105378420 | A | 3/2016 | |
| CN | 106813521 | A | 6/2017 | |
| DE | 2700221 | A1 * | 7/1978 | ............ B21D 53/04 |
| DE | 29604521 | U1 | 6/1996 | |
| DE | 102015000385 | A1 | 7/2016 | |
| FR | 2341341 | A1 | 9/1977 | |
| JP | S380021473 | Y | 10/1963 | |
| JP | S56-066697 | A | 6/1981 | |
| JP | S60-002888 | A | 1/1985 | |
| JP | S60-256800 | A | 12/1985 | |
| JP | H02-0238293 | A | 9/1990 | |
| JP | H04-278195 | A | 10/1992 | |
| JP | H06-074675 | A | 3/1994 | |
| JP | H11-0147149 | A | 6/1999 | |
| JP | 2003-506306 | A | 2/2003 | |
| JP | 2004-025257 | A | 1/2004 | |
| JP | 2006-322698 | A | 11/2006 | |
| JP | 2010-117126 | A | 5/2010 | |
| JP | 2013-512408 | A | 4/2013 | |
| JP | 2013-145068 | A | 7/2013 | |
| JP | 2015-152282 | A | 8/2015 | |
| WO | 2001-010773 | A1 | 2/2001 | |
| WO | 2006-064202 | A1 | 6/2006 | |
| WO | 2010-125643 | A1 | 11/2010 | |
| WO | 2011-065906 | A2 | 6/2011 | |
| WO | 2017-053184 | A1 | 3/2017 | |

OTHER PUBLICATIONS

Extended European Search Report for corresponding Application No. EP 18923866 dated May 19, 2021 (7 Pages).

Chinese Office Action issued for the corresponding Chinese Patent Application No. 201880094997.8 with English translation of pp. 1-3; Issued on Jan. 5, 2022 (total 11 pages).

Office Action issued for the corresponding Japanese Patent Application No. 2020-526782; mailed on Aug. 2, 2022 (total 7 pages).

Office Action issued in the corresponding Japanese Patent Application No. 2022-170251; mailed on Jan. 9, 2024 (total 7 pages).

Office Action issued in the corresponding Japanese Patent Application No. 2022-170251; mailed on Jun. 4, 2024 (total 6 pages).

* cited by examiner

HEAT TRANSPORT DEVICE AND METHOD FOR MANUFACTURING SAME

CROSS REFERENCE TO RELATED APPLICATIONS

This application is a divisional of U.S. patent application Ser. No. 17/253,576 filed on Dec. 17, 2020, which is a U.S. National Phase application of International Application No. PCT/JP2018/024383, filed on Jun. 27, 2018, the disclosures of which are hereby expressly incorporated by reference herein in their entireties.

BACKGROUND

Technical Field

The present invention relates to a heat transport device and a method for manufacturing the same.

Related Art

Exemplary heat transport devices that function through heat exchange between two fluids include heat exchangers, evaporators, condensers, air conditioner outdoor/indoor units, radiators, reactors, fuel cell-related parts, and parts for use in inkjet printing.

For instance, JP 2003-506306 A describes a heat exchanger shown in FIG. 16. FIG. 16 is a schematic perspective view of a conventional heat exchanger.

A heat exchanger 101 shown in FIG. 16 is formed by diffusion bonding. The heat exchanger is formed by stacking on top of each other plates each having a first set of fluid passages 102 formed in one main surface and plates each having a second set of fluid passages 104 formed in one main surface in a direction perpendicular to the first set of fluid passages 102 (the plates circulating two different kinds of refrigerants to be heat-exchanged), and integrally joining the plates together through application of pressure and heat in a vacuum. The thus formed heat exchanger 101 is configured to perform heat exchange between a first refrigerant flowing through the first sets of fluid passages 102 and a second refrigerant flowing through the second sets of fluid passages 104 in the vertically stacked respective plates. In general, the sets of fluid passages 102 and 104 for the refrigerants flowing within the heat exchanger 101 are alternately combined in their stacking direction, as shown in FIG. 16.

The inventors of the present application have examined a method of increasing the heat transmission coefficient between two fluids.

FIG. 17 schematically shows a part of a cross-section taken along line a-a' in FIG. 16. As shown in FIG. 17, when a point α and a point β in a fluid passage 102 of the first set which are at the positions nearest to and farthest from their corresponding flow passage 104 in the second set, respectively, are compared to each other, the point α has a higher heat transmission coefficient, whereas the point β has a lower heat transmission coefficient. The distance between the point α and its corresponding fluid passage 104 has a lower limit value in order to keep the strength of the heat exchanger.

Then, the inventors of the present application assumed that the heat transmission coefficient of the whole of the heat exchanger can be increased by reducing the distance between the point β in the fluid passage 102 and its corresponding fluid passage 104 while keeping the distance between the point α in the fluid passage 102 and its corresponding fluid passage 104. The inventors of the present application thus assumed that this can be realized by replacing the first sets of fluid passages having a linear shape as shown FIG. 17 by meandering fluid passages as shown in FIG. 1.

It is, however, extremely difficult to obtain fluid passages having a complex flow passage structure as shown in FIG. 1 while keeping the strength of the whole of the heat exchanger and achieving low costs.

An object of the present invention is to solve the problem as described above.

More specifically, an object of the present invention is to provide a heat transport device in which one set of flow passages meander and the distance between two sets of flow passages is smaller and is kept at an approximately constant value, and the heat transmission coefficient is therefore increased, thus resulting in downsizing, and reduction in weight and thickness. Another object of the present invention is to provide a method of manufacturing the heat transport device as described above having a high strength at low costs.

SUMMARY

The inventors of the present invention have made an intensive study to solve the problem described above and completed the present invention.

The present invention provides the following (1) to (7).

(1) A heat transport device comprising first sets of flow passages for flowing a first fluid and second sets of flow passages for flowing a second fluid,

- the heat transport device being capable of obtaining a cross-section A satisfying Requirement 1 to Requirement 3 described below:
- Requirement 1 is that the cross-section A is a cross-section perpendicular to the second sets of flow passages;
- Requirement 2 is that in the cross-section A, when a direction in which the first fluid flows in a serpentine manner is taken as a horizontal direction, holes of the second sets of flow passages are arranged in line in the horizontal direction, and hole rows are arranged to form layers in a vertical direction, and in addition, when vertically adjacent hole row layers are compared to each other, holes of the second sets of flow passages are not arranged at identical positions in the horizontal direction; and
- Requirement 3 is that the first sets of flow passages are present between the vertically adjacent hole row layers, respectively, the first sets of flow passages are not connected to the second sets of flow passages, and the first sets of flow passages vertically meander so as to avoid the holes of the second sets of flow passages in the hole row layers sandwiching the first sets of flow passages therebetween in the vertical direction.

(2) A method of manufacturing a heat transport device, the method comprising:

- a flat plate working process including removing at least a part of a main surface of a flat plate P to form recesses at the main surface, thereby obtaining a processed flat plate Q including in its main surface a processed portion which is a portion having the recesses formed therein;
- a first joining process including bringing a main surface of a flat plate R for upper surface and the main surface of the processed flat plate Q into close contact with each other so as to form, between the flat plate R for upper surface and the processed flat plate Q, a first set of flow passages for flowing a first fluid that are formed at the processed portion, and joining together the main surfaces of the flat plate R for upper surface and the processed flat plate Q, thereby obtaining a first flow passage plate;

a plastic working process including subjecting at least a part of a main surface of the first flow passage plate to plastic working so as to deform the first set of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together the second flow passage plates so as to bring main surfaces of the second flow passage plates into contact with each other, thus forming, between one second flow passage plate and another second flow passage plate, a second set of flow passages which are not parallel to the first set of flow passages and where a second fluid flows.

(3) A method of manufacturing a heat transport device, the method comprising:

a flat plate working process including subjecting at least a part of a main surface of a flat plate P to plastic working to form recesses at the main surface, thereby obtaining a processed flat plate Q including in its main surface a processed portion which is a portion having the recesses formed therein;

a first joining process including preparing a flat plate-like spacer X which is processed so as not to have a portion in contact with the processed portion even after a main surface of the spacer is brought into close contact with the main surface of the processed flat plate Q, bringing the main surfaces of the processed flat plate Q and the spacer X into contact with each other, sandwiching the spacer X and the processed flat plate Q between a flat plate R for upper surface and a flat plate S for lower surface, and then joining together main surfaces of the flat plate R for upper surface, the processed flat plate Q, the spacer X, and the flat plate S for lower surface so that there is no space between the flat plate R for upper surface and the flat plate S for lower surface in a portion where the processed portion is not present but only the spacer X is present between the flat plate R for upper surface and the flat plate S for lower surface, and first sets of flow passages for flowing a first fluid are formed between the flat plate R for upper surface and the flat plate S for lower surface in a portion where the processed portion is present but the spacer X is not present between the flat plate R for upper surface and the flat plate S for lower surface, thereby obtaining a first flow passage plate;

a plastic working process including subjecting at least a part of a main surface of the first flow passage plate to plastic working so as to deform the first sets of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together the second flow passage plates so as to bring main surfaces of the second flow passage plates into contact with each other, thus forming, between one second flow passage plate and another second flow passage plate, a second set of flow passages which are not parallel to the first sets of flow passages and where a second fluid flows.

(4) The method of manufacturing a heat transport device according to (2) or (3) above, wherein the method comprises, in the second joining process, operations including:

preparing a flat plate-like spacer Y processed so as not to have a portion in contact with the plastically deformed portion even after a main surface of the flat plate-like spacer and the main surface of its corresponding second flow passage plate are brought into contact with each other; and stacking a first plate serving as the second flow passage plate, a first member serving as the spacer Y, a second plate serving as the second flow passage plate, a third plate serving as the second flow passage plate, a second member serving as the spacer Y, and a fourth plate serving as the second flow passage plate on top of each other in this order; and joining their respective main surfaces together.

(5) The method of manufacturing a heat transport device according to (2) or (3) above, wherein the method comprises, in the second joining process, operations including:

preparing a flat plate T;

stacking a first plate serving as the second flow passage plate, a first member serving as the spacer Y, a first plate serving as the flat plate T, a second plate serving as the second flow passage plate, a second member serving as the spacer Y, and a second plate serving as the flat plate T on top of each other in this order; and joining their respective main surfaces together.

(6) The method of manufacturing a heat transport device according to any one of (2) to (5) above, wherein, in the first joining process, the main surfaces of at least two selected from the group consisting of the flat plate R for upper surface, the processed flat plate Q, the flat plate S for lower surface, and the spacer X are joined together by diffusion bonding.

(7) The method of manufacturing a heat transport device according to any one of (2) to (6) above, wherein, in the second joining process, the main surfaces of at least one selected from the group consisting of the one second flow passage plate and the another second flow passage plate; the second flow passage plate and the spacer Y; the second flow passage plate and the flat plate T; and the spacer Y and the flat plate T are joined together by diffusion bonding.

Effect of the Invention

The present invention can provide a heat transport device in which one set of flow passages meander and the distance between two sets of flow passages is smaller and is kept at an approximately constant value, and the heat transmission coefficient is therefore increased, thus resulting in downsizing, and reduction in weight and thickness. The present invention can also provide a method of manufacturing the heat transport device as described above having a high strength at low costs.

DETAILED DESCRIPTION

Figure 1:
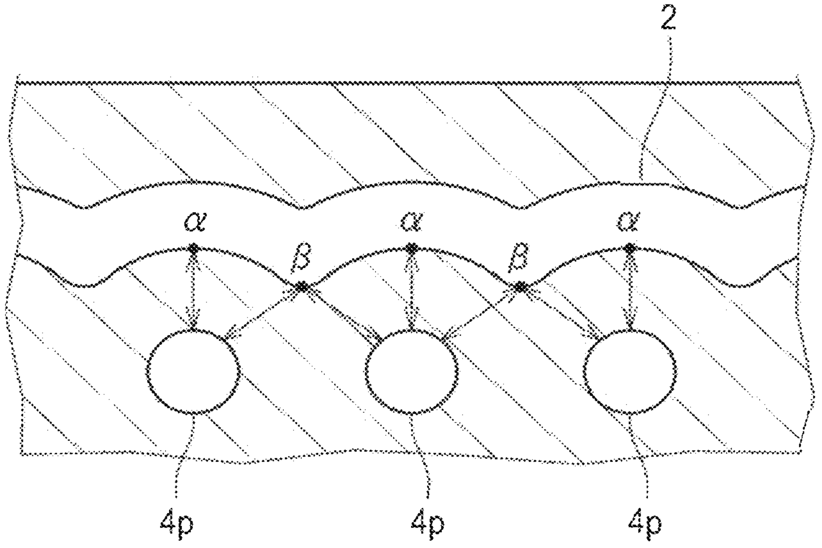
FIG. 1 is a schematic view for illustrating characteristics of a device of the invention as compared with a conventional heat exchanger.

The present invention is now described.

The present invention is directed to a heat transport device including first sets of flow passages for flowing a first fluid and second sets of flow passages for flowing a second fluid. The heat transport device is capable of obtaining a cross-section A satisfying Requirement 1 to Requirement 3 described below.

Requirement 1. The cross-section A is a cross-section perpendicular to the second sets of flow passages.

Requirement 2. In the cross-section A, when a direction in which the first fluid flows in a serpentine manner is taken as a horizontal direction, holes of the second sets of flow passages are arranged in line in the horizontal direction, and hole rows are arranged to form layers in a vertical direction. In addition, when vertically adjacent hole row layers are compared to each other, holes of the second sets of flow passages are not arranged at identical positions in the horizontal direction.

Requirement 3. The first sets of flow passages are present between the vertically adjacent hole row layers, respectively, the first sets of flow passages are not connected to the second sets of flow passages, and the first sets of flow passages vertically meander so as to avoid the holes of the second sets of flow passages in the hole row layers sandwiching the first sets of flow passages therebetween in the vertical direction.

The heat transport device as described above is hereinafter referred to also as "device of the invention."

The present invention is also directed to a method of manufacturing a heat transport device, the method comprising: a flat plate working process including removing at least a part of a main surface of a flat plate P to form recesses at the main surface, thereby obtaining a processed flat plate Q including in its main surface a processed portion which is a portion having the recesses formed therein; a first joining process including bringing a main surface of a flat plate R for upper surface and the main surface of the processed flat plate Q into close contact with each other so as to form, between the flat plate R for upper surface and the processed flat plate Q, a first set of flow passages for flowing a first fluid that are formed at the processed portion, and joining together the main surfaces of the flat plate R for upper surface and the processed flat plate Q, thereby obtaining a first flow passage plate; a plastic working process including subjecting at least a part of a main surface of the first flow passage plate to plastic working so as to deform the first set of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together the second flow passage plates so as to bring main surfaces of the second flow passage plates into contact with each other, thus forming, between one second flow passage plate and another second flow passage plate, a second set of flow passages which are not parallel to the first set of flow passages and where a second fluid flows.

The method of manufacturing the heat transport device as described above is hereinafter referred to also as "first manufacturing method of the invention."

The present invention is further directed to a method of manufacturing a heat transport device, the method comprising: a flat plate working process including subjecting at least a part of a main surface of a flat plate P to plastic working to form recesses at the main surface, thereby obtaining a processed flat plate Q including in its main surface a processed portion which is a portion having the recesses formed therein; a first joining process including preparing a flat plate-like spacer X which is processed so as not to have a portion in contact with the processed portion even after a main surface of the spacer is brought into close contact with the main surface of the processed flat plate Q, bringing the main surfaces of the processed flat plate Q and the spacer X into contact with each other, sandwiching the spacer X and the processed flat plate Q between a flat plate R for upper surface and a flat plate S for lower surface, and then joining together main surfaces of the flat plate R for upper surface, the processed flat plate Q, the spacer X, and the flat plate S for lower surface so that there is no space between the flat plate R for upper surface and the flat plate S for lower surface in a portion where the processed portion is not present but only the spacer X is present between the flat plate R for upper surface and the flat plate S for lower surface, and first sets of flow passages for flowing a first fluid are formed between the flat plate R for upper surface and the flat plate S for lower surface in a portion where the processed portion is present but the spacer X is not present between the flat plate R for upper surface and the flat plate S for lower surface, thereby obtaining a first flow passage plate; a plastic working process including subjecting at least a part of a main surface of the first flow passage plate to plastic working so as to deform the first sets of flow passages to form recesses at the main surface, thereby obtaining a second flow passage plate including in its main surface a plastically deformed portion which is a portion having the recesses formed therein; and a second joining process including stacking thus formed second flow passage plates on top of each other and joining together the second flow passage plates so as to bring main surfaces of the second flow passage plates into contact with each other, thus forming, between one second flow passage plate and another second flow passage plate, a second set of flow passages which are not parallel to the first sets of flow passages and where a second fluid flows.

The method of manufacturing the heat transport device as described above is hereinafter referred to also as "second manufacturing method of the invention."

The term "the manufacturing method of the invention" simply used in the following description refers to all of "the first manufacturing method of the invention" and "the second manufacturing method of the invention."

The device of the invention can be preferably manufactured by the manufacturing method of the invention.

DEVICE OF THE INVENTION

The device of the invention is first described.

The device of the invention is a heat transport device including first sets of flow passages for flowing a first fluid and second sets of flow passages for flowing a second fluid, and can be preferably used as a heat exchanger included, for example, in refrigerating equipment and air-conditioning equipment. In addition, the device can also be used as a cooling device that may be used to cool electronic equipment such as computers.

The first fluid and the second fluid are not particularly limited, and, for example, a conventionally known refrigerant can be used. Specifically, water (pure water and the like), alcohols (ethanol and the like), chlorofluorocarbons (CFCs) and CFC substitutes can be used.

There is no particular limitation on the cross-sectional shape and the diameter of the first sets of flow passages and the second sets of flow passages. For example, these sets of flow passages may have a substantially circular cross-sectional shape and a diameter (Heywood diameter) of 0.05 to 5 mm. The diameter is preferably 0.2 to 2 mm.

The first sets of flow passages and the second sets of flow passages preferably have a smaller shortest distance therebetween because the heat transmission coefficient can be increased. On the other hand, the first sets of flow passages and the second sets of flow passages preferably have a larger shortest distance therebetween because the strength of the device of the invention can be increased. An optimal value can be selected for the distance between the first sets of flow passages and the second sets of flow passages depending on the performance required for the device of the invention. For example, the first sets of flow passages and the second sets of flow passages may have therebetween a shortest distance of 0.05 to 1 mm, and preferably have therebetween a shortest distance of 0.1 to 0.3 mm.

Schematic views are used to describe the device of the invention.

Figure 2A:
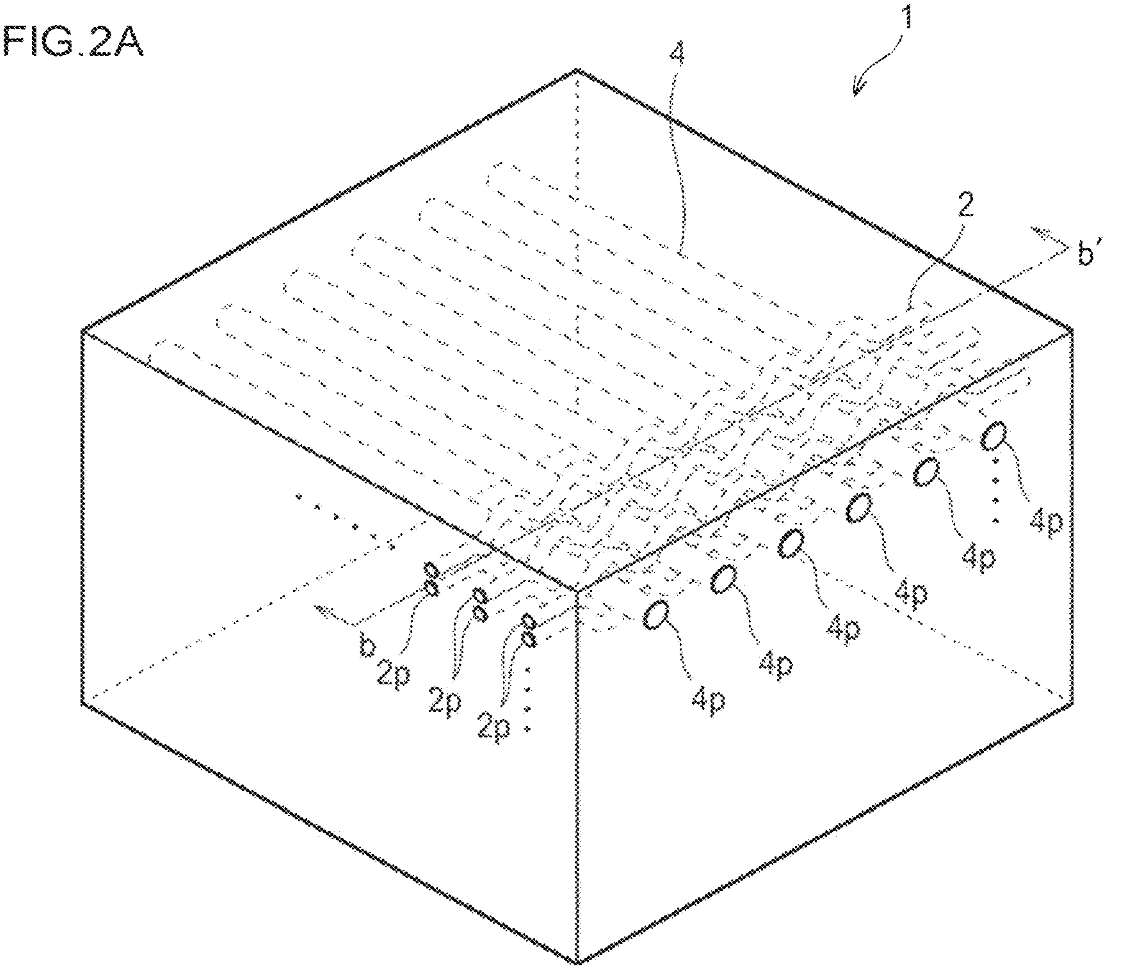
FIG. 2A illustrates a schematic perspective view of the device of the invention.
Figure 2B:
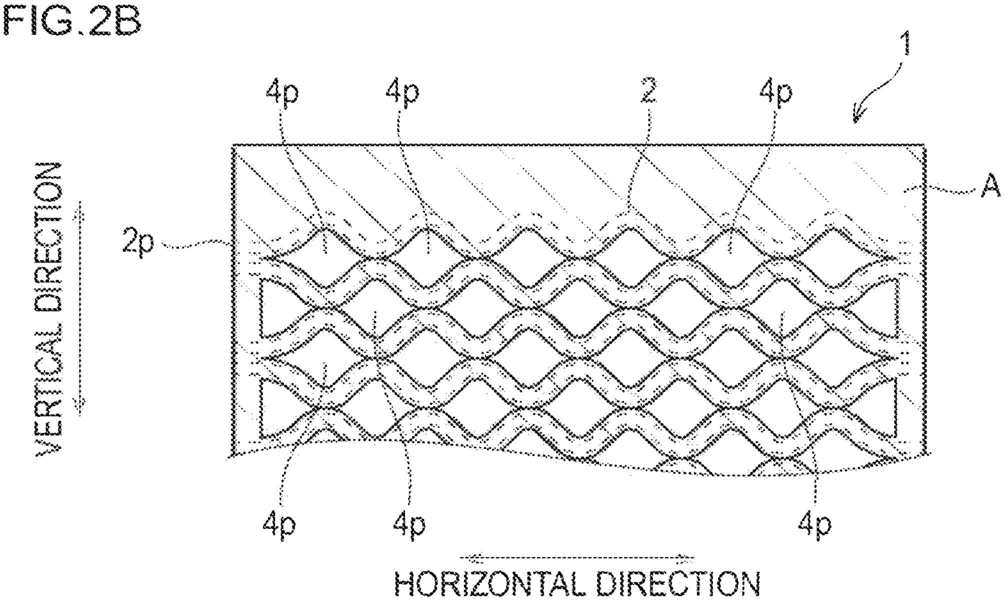
FIG. 2B is a cross-sectional view taken along line b-b' in FIG. 2A.

FIG. 2A shows a schematic perspective view of the device of the invention, and FIG. 2B shows a cross-sectional view taken along line b-b' in FIG. 2A.

In a device 1 of the invention illustrated in FIGS. 2A and 2B, as shown in FIG. 2A, first sets of flow passages 2 for flowing a first fluid are approximately perpendicular to second sets of flow passages 4 for flowing a second fluid.

However, in the device of the invention, the first sets of flow passages 2 for flowing the first fluid may not be perpendicular to the second sets of flow passages 4 for flowing the second fluid.

Figure 3A:
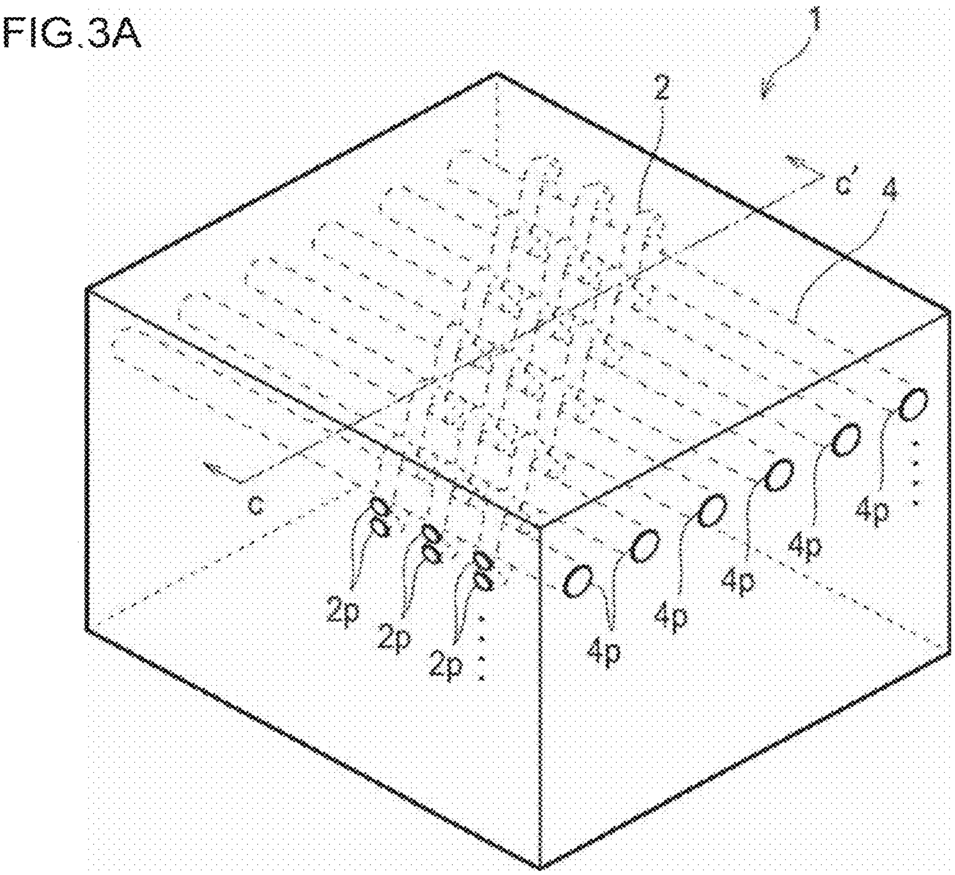
FIG. 3A illustrates a schematic perspective view of another device of the invention.
Figure 3B:
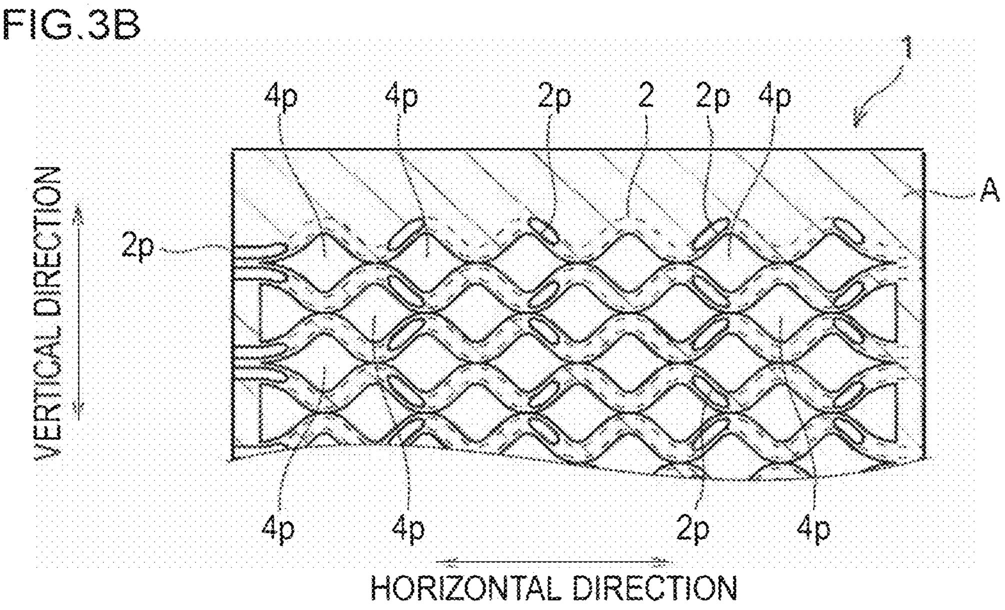
FIG. 3B is a cross-sectional view taken along line c-c' in FIG. 3A.

For instance, the first sets of flow passages 2 may be formed in a direction non-perpendicular to the second sets of flow passages 4 as in the device of the invention illustrated in FIGS. 3A and 3B.

Figure 4A:
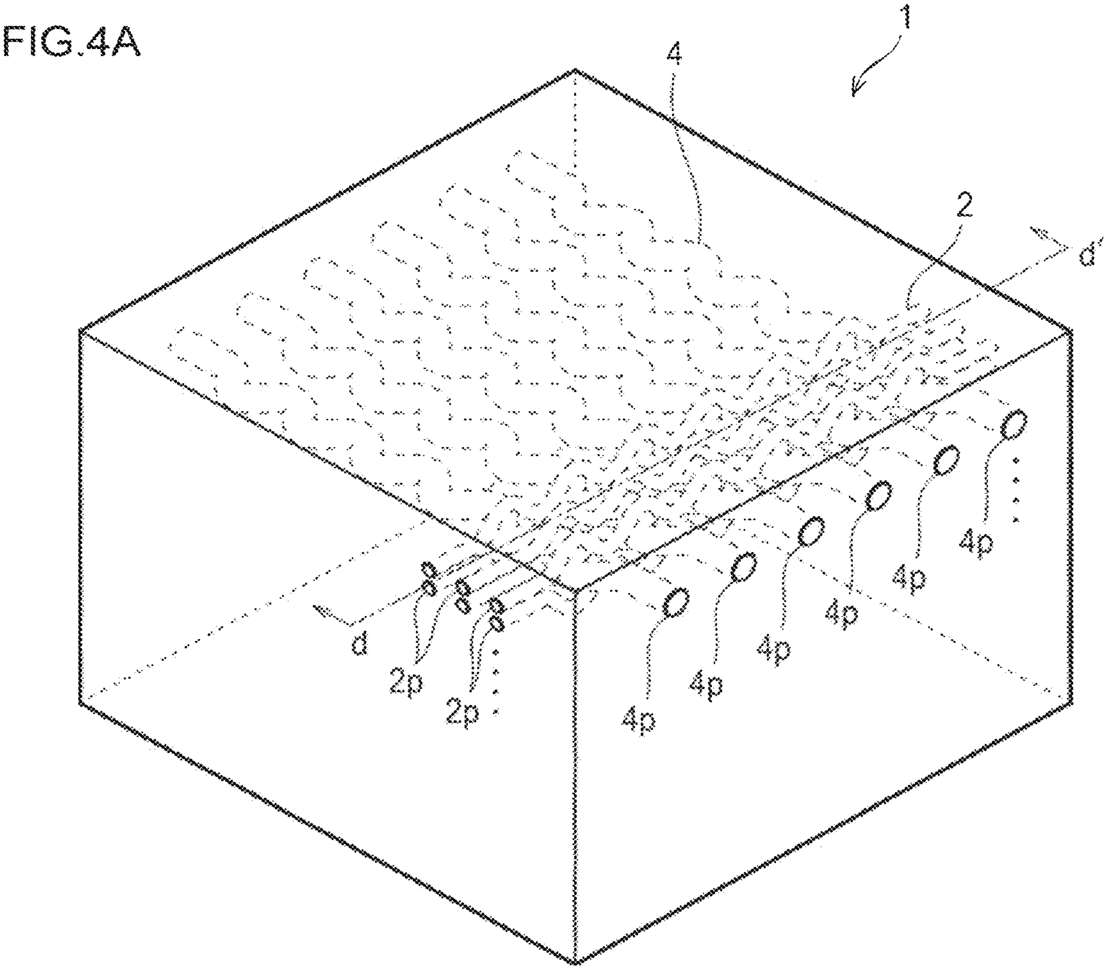
FIG. 4A illustrates a schematic perspective view of still another device of the invention.
Figure 4B:
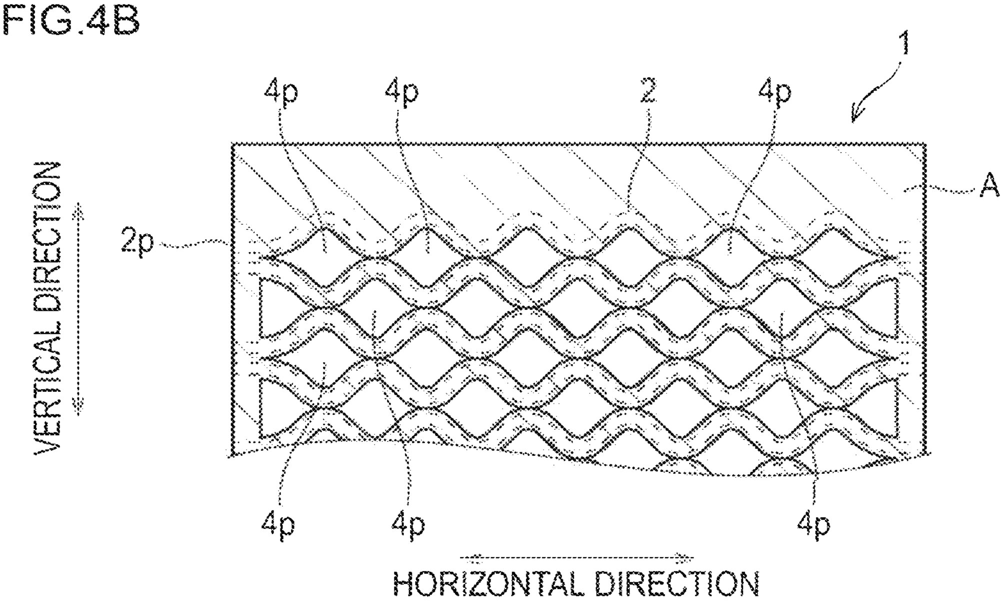
FIG. 4B is a cross-sectional view taken along line d-d' in FIG. 4A.

For instance, the second sets of flow passages 4 may have a zigzag shape as in the device of the invention illustrated in FIGS. 4A and 4B.

In FIGS. 2A to 4B, "2*p*" denotes an inlet hole or outlet hole of each flow passage in the first set, or a hole of each flow passage in the first set emerging at the cross-section, and "4*p*" denotes an inlet hole or outlet hole of each flow passage in the second set.

The device of the invention is a heat transport device that is capable of obtaining a cross-section A satisfying Requirement 1 to Requirement 3 described below.

Requirement 1

In the devices of the invention as illustrated in FIGS. 2A to 4B, the cross-sections A as illustrated in FIG. 2B, FIG. 3B, and FIG. 4B can be obtained by cutting the devices of the invention in a direction perpendicular to the second sets of flow passages.

The cross-section A may not be a cross-section in a direction perpendicular to all the second sets of flow passages in the device of the invention. Depending on the configuration of the second sets of flow passages, a cross-section perpendicular to all the second sets of flow passages may not be obtained. In such a case, a cross-section in a direction perpendicular to some flow passages of each second set in the device of the invention (to the largest possible number of flow passages of each second set in the device of the invention) is taken as the cross-section A in the device of the invention.

For instance, in the case of the device 1 of the invention shown in FIGS. 2A and 2B, the second sets of flow passages 4 are linearly formed and therefore a cross-section in a direction perpendicular to the sets of flow passages, namely a cross-section taken along line b-b' in FIG. 2A is the cross-section A and is shown in FIG. 2B.

Also in the case of, for instance, the device 1 of the invention shown in FIGS. 3A and 3B, the second sets of flow passages 4 are linearly formed and therefore a cross-section in a direction perpendicular to the sets of flow passages, namely a cross-section taken along line c-c' in FIG. 3A is the cross-section A and is shown in FIG. 3B. In the case in which the first sets of flow passages 2 are formed in an oblique direction with respect to the second sets of flow passages 4 as shown in FIG. 3A, the cross-section A may have a plurality of holes 2*p* in the first sets of flow passages as shown in FIG. 3B. For ease of understanding, positions of the first sets of flow passages 2 (lines assuming the first sets of flow passages 2 are seen through the cross-section A) are shown in dotted lines in FIG. 3B, but in the case of FIG. 3B, only the holes 2*p* of the first sets of flow passages 2 should actually appear on FIG. 3B.

For instance, in the case of the device 1 of the invention shown in FIGS. 4A and 4B, the second sets of flow passages 4 are not linearly formed. It is, however, possible to obtain a cross-section in a direction perpendicular to the sets of flow passages. Namely, a cross-section taken along line d-d' in FIG. 4A is the cross-section A and is shown in FIG. 4B. In FIG. 4A, the device of the invention is cut at points (curved points) of the second sets of flow passages where the direction is changed but can also be cut at other points.

Figure 5:
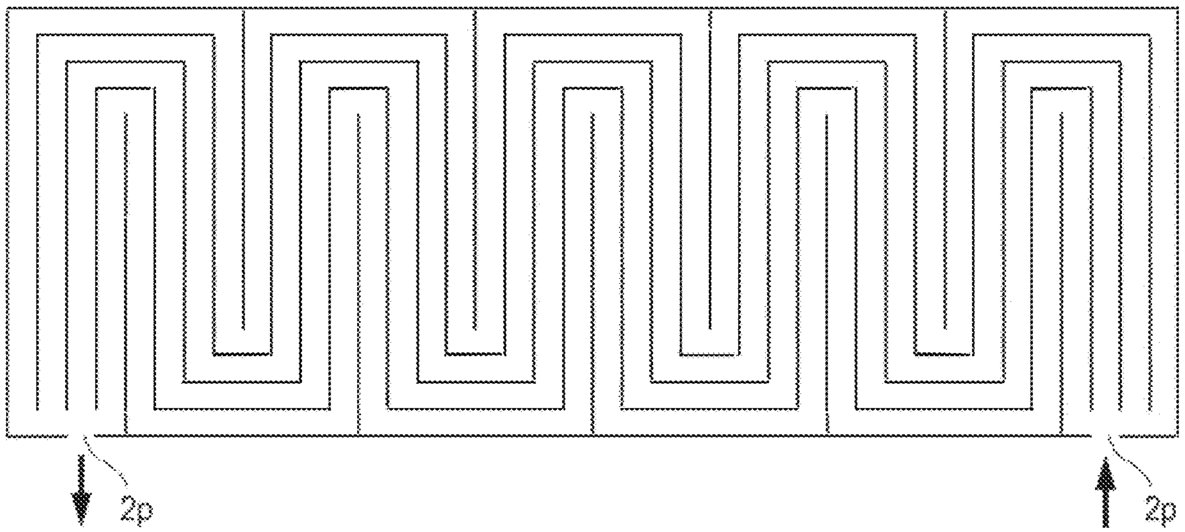
FIG. 5 is a diagram illustrating a configuration example of a first set of flow passages assuming that the first set of flow passages are only seen from above of the device of the invention.
Figure 6:
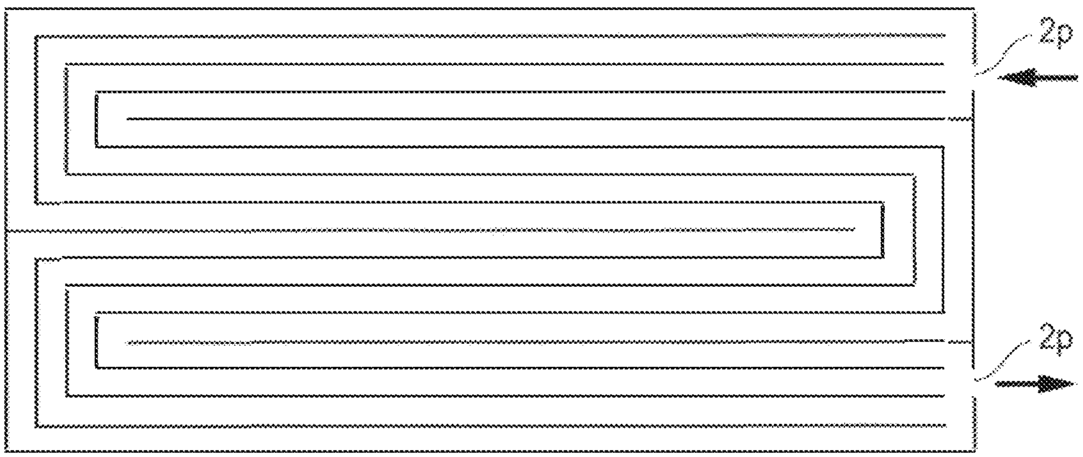
FIG. 6 is a diagram illustrating a configuration example of a second set of flow passages assuming that the second set of flow passages are only seen from above of the device of the invention.

For ease of understanding, the first sets of flow passages and the second sets of flow passages in FIGS. 2A to 4B illustrate flow passages having extremely simple configurations, respectively. For instance, when the first set of flow passages are only seen from above the device of the invention, the device may also have flow passages as shown in FIG. 5. For instance, when the second set of flow passages are only seen from above the device of the invention, the device may also have flow passages as shown in FIG. 6.

The first sets of flow passages and the second sets of flow passages may have other shapes such as a corrugated pattern (parallel wave pattern) shape, a herringbone pattern (herring-bone pattern) shape, and a double herringbone pattern shape.

Figure 7:
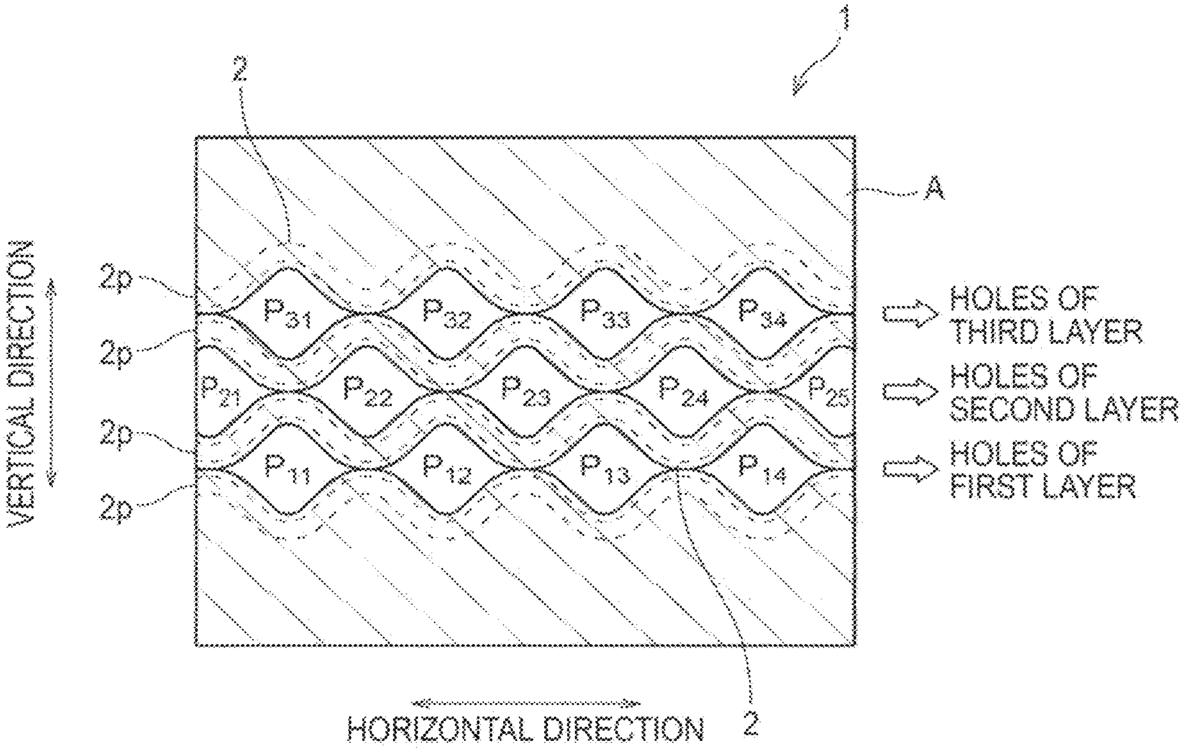
FIG. 7 illustrates a schematic cross-sectional view of the device of the invention.

Requirement 2 FIG. 7 is used to describe Requirement 2. The cross-section A shown in FIG. 7 is similar to that in FIG. 2B. The holes of the second sets of flow passages are denoted by "4$p$" in FIG. 2B but are denoted by "$P_{mk}$" (m and k are integers of 1 or more, respectively) in FIG. 7.

In the device of the invention, as illustrated in FIG. 7, when a direction in which the first fluid flows in a serpentine manner in the cross-section A is taken as a horizontal direction, holes ($P_{mk}$) of the second sets of flow passages are arranged in line in the horizontal direction, and hole rows are arranged to form layers in a vertical direction. In FIG. 7, the holes ($P_{mk}$) are horizontally arranged in line and three hole layers each forming a hole row are present in the vertical direction. The hole layers each forming a hole row are expressed, from below to above, by first layer, second layer, and third layer, respectively, and holes in the first layer, second layer and third layer are denoted by $P_{1k}$, $P_{2k}$, and $P_{3k}$, respectively. That is to say, m denotes the layer number. In each layer, the holes are expressed, from left to right, by $P_{m1}$, $P_{m2}$, $P_{m3}$, . . . $P_{mk}$, respectively. In other words, k is a hole (serial) number in a single layer. The hole $P_{3k}$ in the third layer should be present just above the hole $P_{1k}$ present in the first layer. For instance, the hole $P_{33}$ in the third layer should be present just above the hole $P_{13}$ present in the first layer. The hole $P_{2k}$ in the second layer should be present at the upper left of the hole $P_{1k}$ present in the first layer. For instance, the hole $P_{23}$ in the second layer should be present at the upper left of the hole $P_{13}$ present in the first layer.

The cross-section A is obtained by cutting the device of the invention in the direction perpendicular to the second sets of flow passages, and accordingly, in the case where the first sets of flow passages 2 are formed in the oblique direction with respect to the second sets of flow passages 4 as in FIG. 3B, from a three-dimensional point of view, the cross-section A is not parallel to the direction in which the first fluid flows in the serpentine manner. In such a case, as for the direction in which the first fluid flows in the serpentine manner, in the cross-section A (that is, from a two-dimensional point of view), the direction on the assumption that the first fluid is projected onto the cross-section A is deemed to be the direction in which the first fluid flows in the serpentine manner, and the direction is taken as the horizontal direction.

In such a case, the first and second layers, and the second and third layers form the hole row layers vertically adjacent to each other, respectively, and in the first and second layers adjacent to each other, the holes of the second sets of flow passages are not located at the same positions in the horizontal direction. In other words, the center of each hole in the second layer is not present just above the center of each hole in the first layer. Each hole in the second layer is present between two holes in the first layer. Also in the second and third layers adjacent to each other, the holes of the second sets of flow passages are not located at the same positions in the horizontal direction. In other words, the center of each hole in the third layer is not present just above the center of each hole in the second layer. Each hole in the third layer is present between two holes in the second layer.

Requirement 3

In the device of the invention, as shown in FIG. 2B, FIG. 3B, FIG. 4B, and FIG. 7, the first sets of flow passages 2 are present between the vertically adjacent hole row layers, respectively.

The first sets of flow passages 2 are not connected to the second sets of flow passages 4.

The first sets of flow passages 2 vertically meander so as to avoid the holes (4$p$, $P_{mk}$) of the second sets of flow passages in the hole row layers sandwiching the first sets of flow passages therebetween in the vertical direction.

For instance, in FIG. 7, a first set of flow passages 2 are present between a first layer having holes ($P_{11}$, $P_{12}$, $P_{13}$, $P_{14}$) of one second set of flow passages and a second layer having holes ($P_{21}$, $P_{22}$, $P_{23}$, $P_{24}$, $P_{25}$) of another second set of flow passages, and the first set of flow passages vertically meander so as to avoid the holes ($P_{11}$, $P_{12}$, $P_{13}$, $P_{14}$) of the first layer and the holes ($P_{21}$, $P_{22}$, $P_{23}$, $P_{24}$, $P_{25}$) of the second layer.

As shown in FIG. 7, a band portion that forms a boundary between the first and second layers meanders vertically, and the corresponding first set of flow passages meander along the shape of the band portion.

Because the first sets of flow passages meander and the distance to their corresponding second sets of flow passages is kept at an approximately constant value, the device of the invention as described above achieves a high heat transmission coefficient, thus resulting in downsizing, and reduction in weight and thickness.

Figure 8:
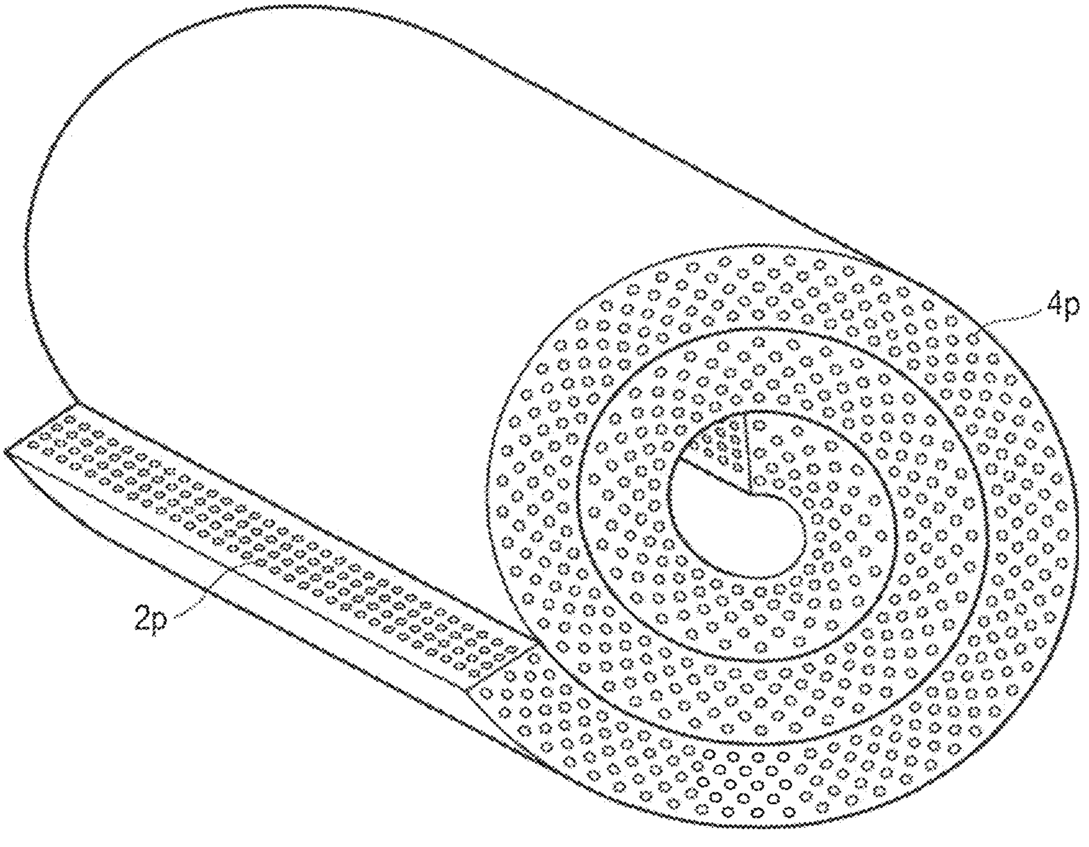
FIG. 8 illustrates a schematic perspective view of the device of the invention.

The device of the invention may have a plate-like shape. However, the shape of the device of the invention having a plate-like shape may also be changed to have, for example, a cylindrical shape as shown in FIG. 8.

MANUFACTURING METHOD OF THE INVENTION

Next, the manufacturing method of the invention is described.

The device of the invention as described above can be preferably manufactured by the manufacturing method of the invention.

The manufacturing method of the invention includes a flat plate working process, a first joining process, a plastic working process, and a second joining process.

Flat Plate Working Process

The flat plate working process in the manufacturing method of the invention is described with reference to FIGS. 9A, 9B, 10A and 10B.

Figure 9A:
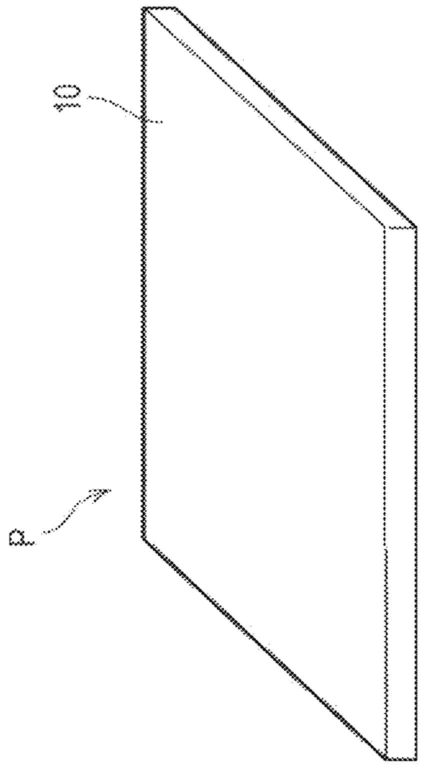
FIGS. 9A and 9B are schematic views for illustrating a flat plate working process in a manufacturing method of the invention.
Figure 10B:
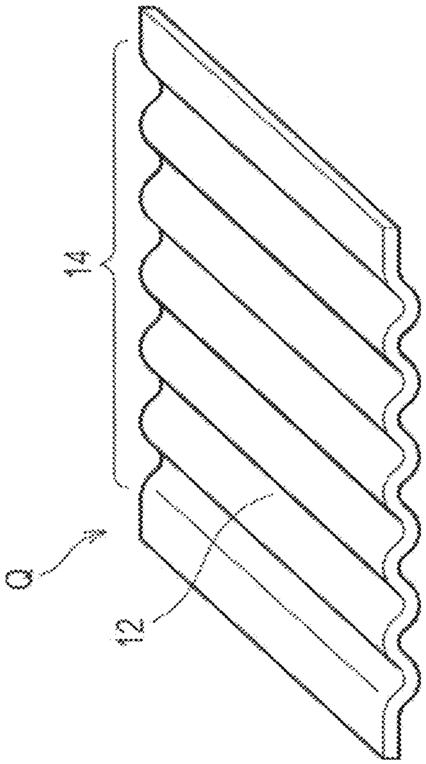
FIGS. 10A and 10B are schematic views for illustrating another flat plate working process in the manufacturing method of the invention.
Figure 10A:
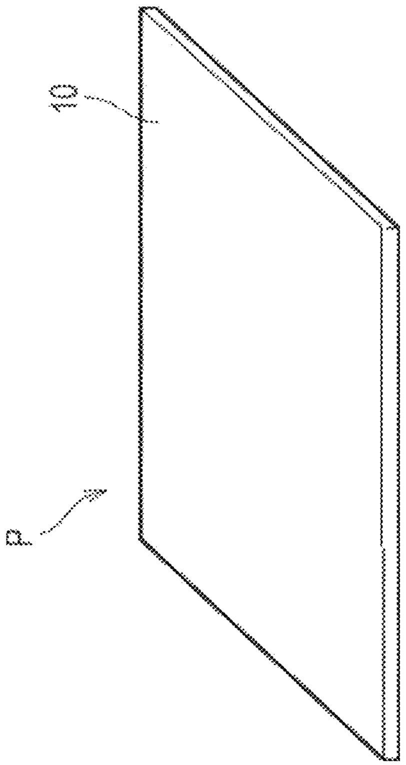

In the flat plate working process, a flat plate P is first prepared (FIG. 9A, FIG. 10A).

The flat plate P is preferably a metallic flat plate, and more preferably a flat plate made of stainless steel, aluminum, iron, steel, copper, titanium, Inconel or Hastelloy.

The size and the thickness are not particularly limited and the flat plate preferably has a thickness of about 0.05 to 5 mm, and more preferably about 0.2 to 2 mm.

Next, at least a part of a main surface of the flat plate P is processed to form recesses at the main surface.

Figure 9B:
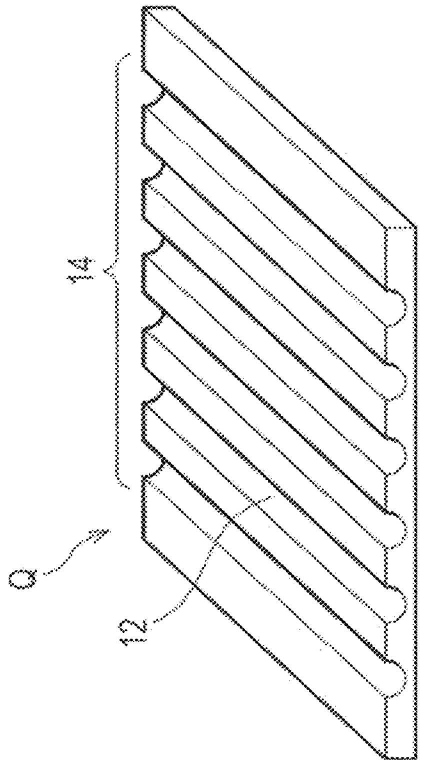

For instance, as shown in FIG. 9B and FIG. 10B, at least a part of a main surface 10 of the flat plate P is processed to form recesses 12 at the main surface 10.

A processed flat plate Q that includes, in the main surface 10, a processed portion 14 which is a portion having the recesses formed therein is thus obtained.

In a first manufacturing method of the invention, at least a part of the main surface of the flat plate P is removed to form recesses at the main surface.

Removal processing refers to removing at least a part of the main surface of the flat plate P and is not particularly limited as long as the process used is capable of forming recesses at the main surface. Etching processing or cutting machining is preferably used for removal processing.

The recesses 12 shown in FIG. 9B indicate recesses in the case of removal processing.

In a second manufacturing method of the invention, at least a part of the main surface of the flat plate P is subjected to plastic working to form recesses at the main surface.

Plastic working refers to plastically deforming at least a part of the main surface of the flat plate P and is not particularly limited as long as the process used is capable of forming recesses at the main surface. Press working or processing using gear rolls is preferably used for plastic working. The processing using gear rolls refers to a process in which a metallic plate or band is inserted between two gear rolls and processed, and exemplary methods are illustrated in JP 11-147149 A and JP 2004-025257 A.

The recesses 12 shown in FIG. 10B indicate recesses in the case of plastic working.

First Joining Process

Next, the first joining process in the first manufacturing method of the invention is described with reference to FIGS. 11A to 11C.

Figure 11B:
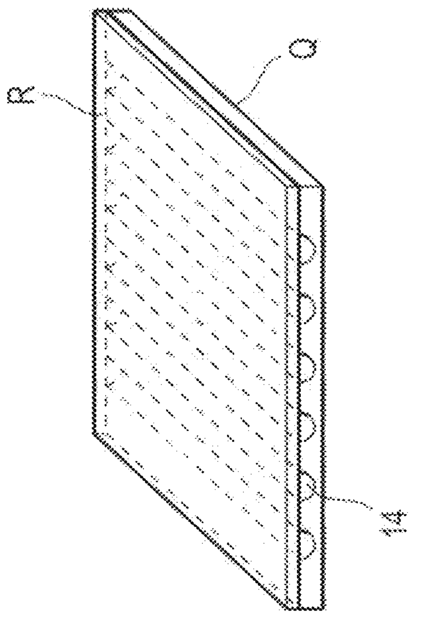
FIGS. 11A to 11C are schematic views for illustrating a first joining process in the manufacturing method of the invention.
Figure 11C:
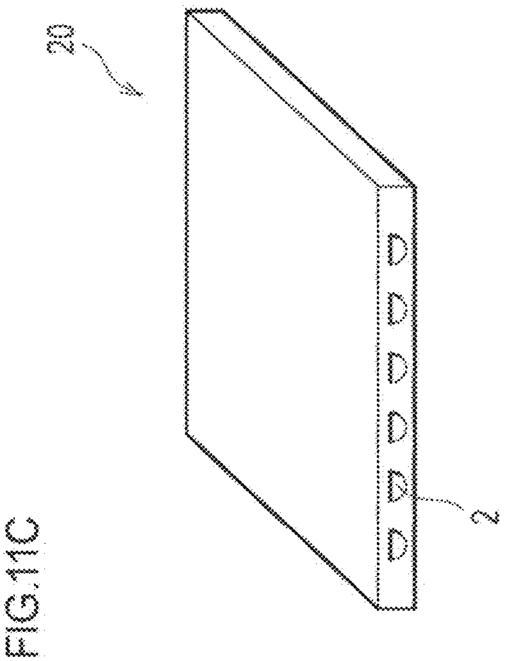
Figure 11A:
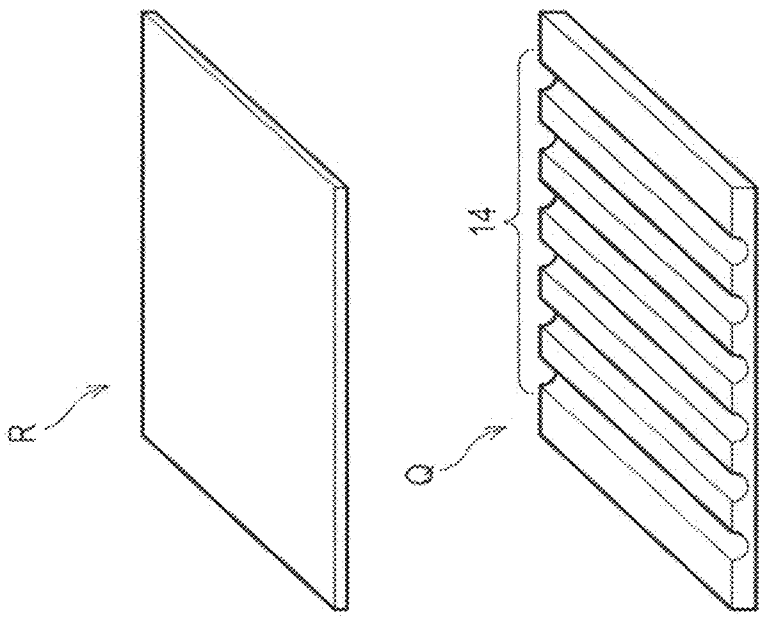

In the first joining process in the first manufacturing method of the invention, a flat plate R for upper surface is first prepared (FIG. 11A).

The material, the size, the thickness and the like of the flat plate R for upper surface are not particularly limited and are preferably the same as those in the above-mentioned flat plate P.

Next, main surfaces of the flat plate R for upper surface and a processed flat plate Q are brought into close contact with each other (FIG. 11B). The main surface of the processed flat plate Q having recesses at the processed portion 14 is opposed to the flat plate R for upper surface.

Then, the main surfaces of the flat plate R for upper surface and the processed flat plate Q are joined together, whereby a first flow passage plate 20 having, between the flat plate R for upper surface and the processed flat plate Q, a first set of flow passages 2 formed at the processed portion 14 can be obtained (FIG. 11C).

Next, the first joining process in the second manufacturing method of the invention is described with reference to FIGS. 12A to 11C.

Figure 12A:
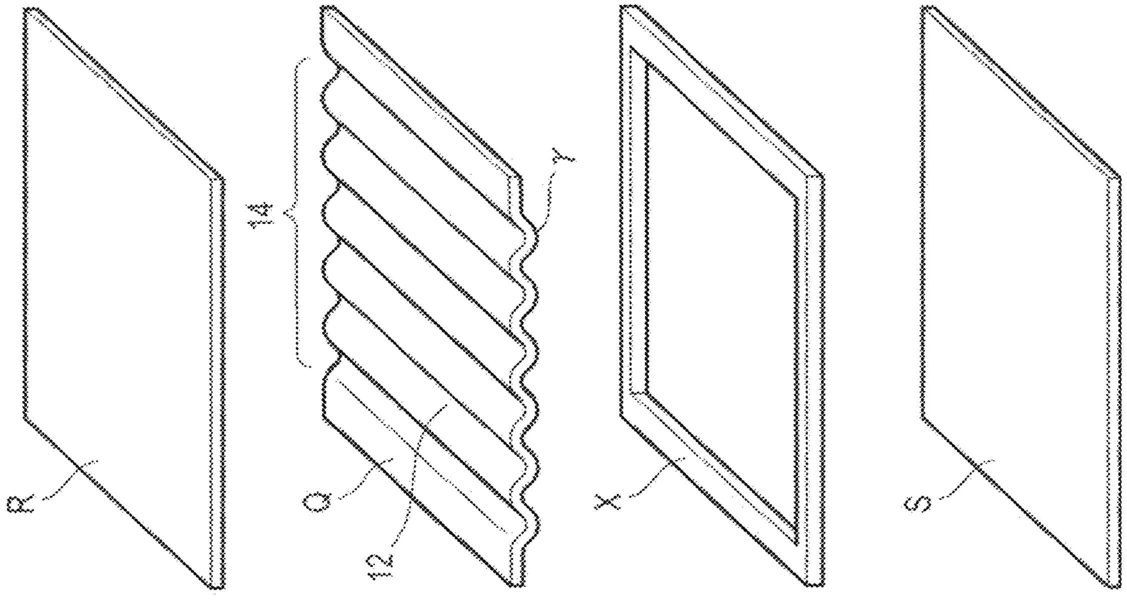
FIGS. 12A to 12C are schematic views for illustrating another first joining process in the manufacturing method of the invention.

In the first joining process in the second manufacturing method of the invention, a flat plate R for upper surface and a flat plate S for lower surface are first prepared (FIG. 12A).

The material, the size, the thickness and the like of the flat plate R for upper surface and the flat plate S for lower surface are not particularly limited and are preferably the same as those in the above-mentioned flat plate P.

A flat plate-like spacer X which is processed so as not to have a portion in contact with the processed portion 14 even after main surfaces of the spacer and a processed flat plate Q are brought into close contact with each other is prepared (FIG. 12A).

For instance, the spacer X can be obtained by preparing a plate which is made of the same material as that of the flat plate R for upper surface and has a slightly larger size than that of the flat plate R for upper surface, and punching the prepared plate.

The processed portion 14 of the processed flat plate Q is formed by plastic working such as press working, and therefore recesses (recesses 12) are formed at one main surface of the processed flat plate Q and protrusions γ are formed at the other main surface of the processed flat plate Q. Then, the thickness of the spacer X is adjusted depending on the size of the protrusions γ of the processed flat plate Q. More specifically, the thickness of the processed flat plate Q is preferably adjusted so that the tops of the protrusions γ come into contact with a main surface of the flat plate S for lower surface in the state of FIG. 12B to be described later. The tops of the protrusions γ and the main surface of the flat plate S for lower surface are joined together to obtain a heat transport device having a higher strength, which is preferable.

Next, the main surface of the processed flat plate Q is brought into contact with the main surface of the spacer X. As illustrated in FIG. 12A, the main surface of the processed flat plate Q on the side of the protrusions γ at the processed portion 14 is brought into contact with the main surface of the spacer X.

Figure 12B:
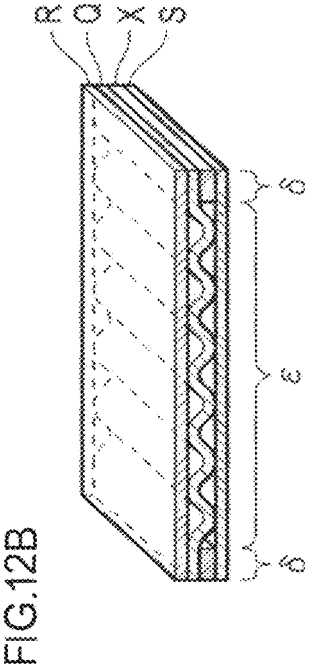

Then, the spacer X and the processed flat plate Q are sandwiched between the flat plate R for upper surface and the flat surface S for lower surface to obtain the state shown in FIG. 12B.

FIG. 12B shows a drawing in the state obtained by cutting in a direction which is parallel to the longitudinal direction (horizontal direction in the drawing) of the flat plate R for upper surface and the flat plate S for lower surface and is perpendicular to the main surfaces.

Figure 12C:
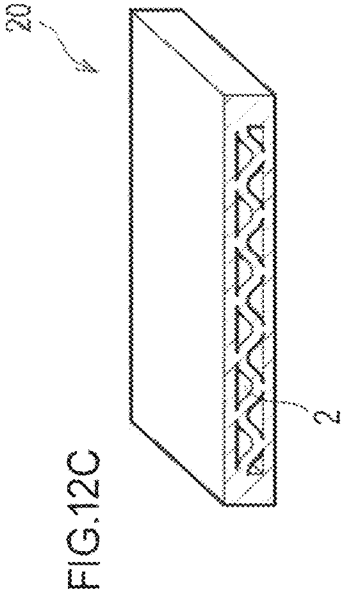

In this case, the flat plate R for upper surface and the flat plate S for lower surface preferably have no space therebetween in the portion where the processed portion 14 is not present but the spacer X is only present between the flat plate R for upper surface and the flat plate S for lower surface (portion indicated by δ in FIG. 12B). Then, when the main surfaces of the flat plate R for upper surface, the processed flat plate Q, the spacer X, and the flat plate S for lower surface are joined together, a first flow passage plate 20 can be obtained which includes first sets of flow passages 2 for flowing a first fluid between the flat plate R for upper surface and the flat plate S for lower surface in the portion (portion indicated by c in FIG. 12B) where the processed portion is present but the spacer X is not present between the flat plate R for upper surface and the flat plate S for lower surface (FIG. 12C).

In the first joining process in the manufacturing method of the invention as described above, the main surfaces of at least two selected from the group consisting of the flat plate R for upper surface, the processed flat plate Q, the flat plate S for lower surface, and the spacer X can be joined together by brazing or the like but are preferably joined together by diffusion bonding.

In the first joining process in the first manufacturing method of the invention, the main surfaces of the flat plate R for upper surface and the processed flat surface Q can be joined together by brazing or the like but are preferably joined together by diffusion bonding.

In the first joining process in the second manufacturing method of the invention, the main surfaces of at least two selected from the group consisting of the flat plate R for upper surface, the processed flat plate Q, the flat plate S for lower surface, and the spacer X can be joined together by brazing or the like but are preferably joined together by diffusion bonding. The main surfaces of the flat plate R for upper surface, the processed flat plate Q, the flat plate S for lower surface, and the spacer X are more preferably joined together by diffusion bonding.

The obtained heat transport device has thus a higher strength.

Plastic Working Process

Next, the plastic working process in the manufacturing method of the invention is described with reference to FIGS. 13A and 13B.

In the plastic working process, a first flow passage plate is prepared. Although the first flow passage plate 20 shown in FIG. 12C is illustrated, the first flow passage plate 20 shown in FIG. 11C may be used.

Figure 13B:
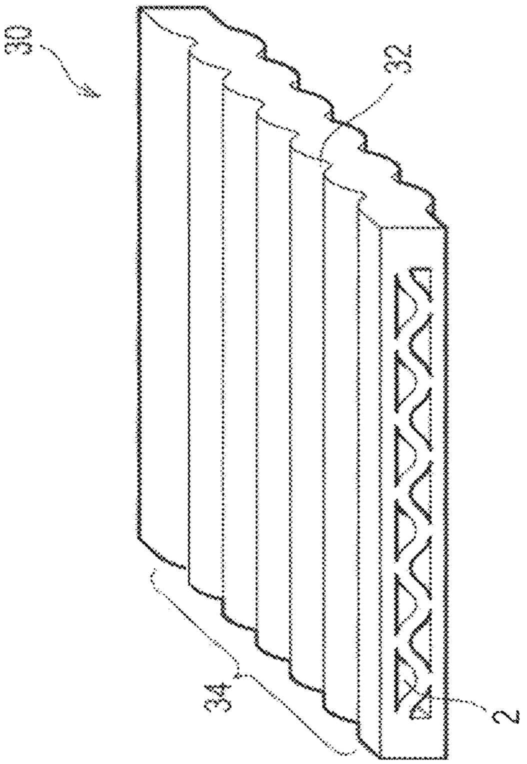
FIGS. 13A and 13B are schematic views for illustrating a plastic working process in the manufacturing method of the invention.
Figure 13A:
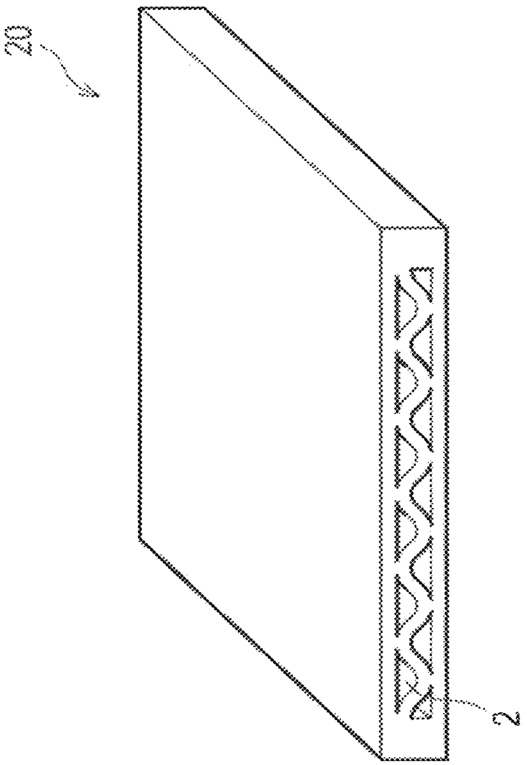

Next, at least a part of a main surface of the first flow passage plate is subjected to plastic working to deform the first sets of flow passages, thus forming recesses 32 at the main surface (FIG. 13B). The portion where the recesses 32 are formed is hereinafter referred to as plastically deformed portion 34.

A second flow passage plate 30 including the plastically deformed portion 34 in the main surface can be thus obtained.

Second Joining Process

Next, the second joining process in the manufacturing method of the invention is described.

In the second joining process, a plurality of second flow passage plates 30 are stacked on top of each other and joined together to bring main surfaces of the plurality of second flow passage plates into contact with each other, thus forming, between one second flow passage plate 30 and another second flow passage plate 30, a second set of flow passages 4 which are not parallel to the first set of flow passages 2 and where a second fluid flows.

Figure 14B:
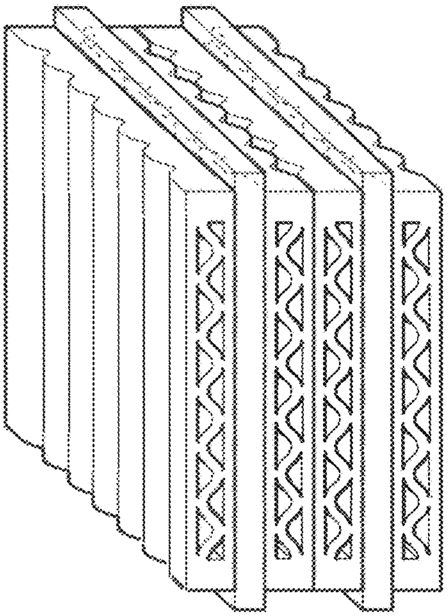
FIGS. 14A to 14C are schematic views for illustrating a second joining process in the manufacturing method of the invention.
Figure 14C:
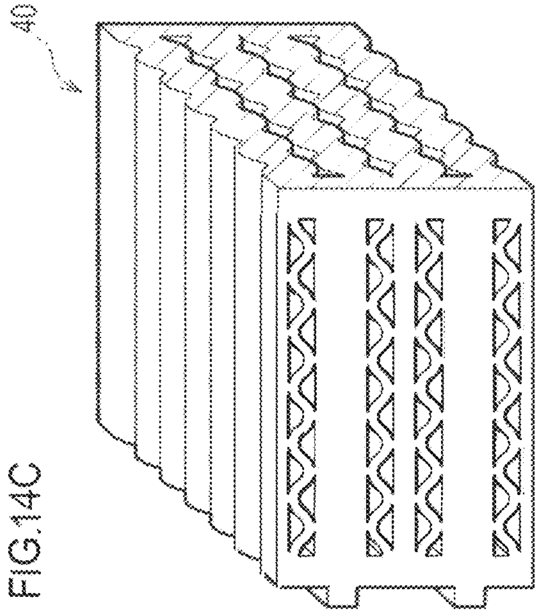
Figure 14A:
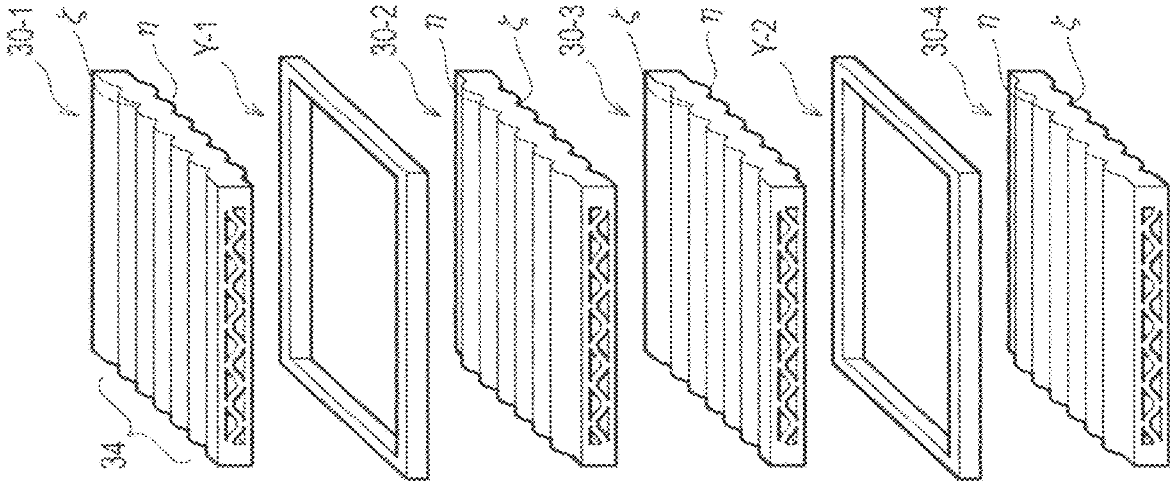

FIGS. 14A to 14C show a preferred embodiment of the second joining process. The second joining process in the manufacturing method of the invention is not limited to the preferred embodiment to be described with reference to FIGS. 14A to 14C.

In this embodiment, flat plate-like spacers Y each of which is processed so as not to have a portion in contact with the plastically deformed portion 34 even after main surfaces of the flat plate-like spacer and its corresponding second flow passage plate 30 are brought into close contact with each other are first prepared.

For instance, each spacer Y can be obtained by preparing a plate which is made of the same material as that of the flat plate R for upper surface and has a slightly larger size than that of the flat plate R for upper surface, and punching the prepared plate.

The plastically deformed portion 34 of each second flow passage plate 30 is formed by plastic working, and therefore recesses (recesses ζ) are formed at one main surface of the second flow passage plate 30 and protrusions η are formed at the other main surface of the second flow passage plate 30. The thickness of each spacer Y is adjusted depending on the size of the protrusions η of its corresponding second flow passage plates 30. More specifically, in the state of FIG. 14B to be described later, the thickness of each spacer Y is preferably adjusted so that the tops of the protrusions η come into contact with the tops of the protrusions η in another second flow passage plate. The protrusions are joined together to obtain a heat transport device having a higher strength, which is preferable.

Next, a plurality of plates serving as the second flow passage plates 30 are stacked on top of each other. More specifically, as shown in FIG. 14A and FIG. 14B, a first plate 30-1 serving as the second flow passage plate, a first spacer Y-1, a second plate 30-2 serving as the second flow passage plate, a third plate 30-3 serving as the second flow passage plate, a second spacer Y-2, and a fourth plate 30-4 serving as the second flow passage plate are stacked on top of each other in this order.

The first plate 30-1 serving as the second flow passage plate and the second plate 30-2 serving as the second flow passage plate are preferably stacked on top of each other so that the protrusions η in the respective plastically deformed portions 34 come into contact with each other, the first spacer Y being sandwiched therebetween. The third plate 30-3 serving as the second flow passage plate and the fourth plate 30-4 serving as the second flow passage plate are preferably stacked on top of each other so that the protrusions η in the respective plastically deformed portions 34 come into contact with each other, the second spacer Y being sandwiched therebetween. In this case, a heat transport device having a higher strength is obtained, which is preferable.

Then, their respective main surfaces are joined together so that they come into contact with each other. It is preferable to simultaneously join the protrusions η of the two second flow passage plates.

The device 40 of the invention as shown in FIG. 14C can be thus obtained. In FIG. 14C, a right side surface is a cross-section.

Figure 15B:
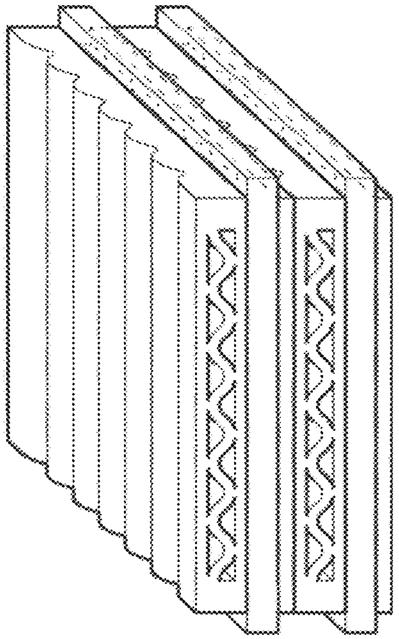
FIGS. 15A to 15C are schematic views for illustrating another second joining process in the manufacturing method of the invention.

Next, another preferred embodiment of the second joining process is described with reference to FIGS. 15A to 15C. The second joining process in the manufacturing method of the invention is not limited to the preferred embodiment to be described with reference to FIGS. 15A to 15C.

In this embodiment, flat plates T are prepared in addition to the spacers Y described above.

The flat plates T are not particularly limited and, for example, plates of the same type as the flat plate P described above may be used.

Next, a plurality of plates serving as the second flow passage plates 30 are stacked on top of each other. More specifically, as shown in FIG. 15A and FIG. 15B, a first plate 30'-1 serving as the second flow passage plate, a first spacer Y-1, a first flat plate T-1, a second plate 30'-2 serving as the second flow passage plate, a second spacer Y-2, and a second flat plate T-2 are stacked on top of each other in this order.

The first plate 30'-1 serving as the second flow passage plate and the first flat plat T-1 are preferably stacked on top of each other so that the protrusions η in the plastically deformed portion 34 come into contact with a main surface of the flat plate T-1, the first spacer Y being sandwiched therebetween. The second plate 30-2 serving as the second flow passage plate and the second flat plat T-2 are preferably stacked on top of each other so that the protrusions η in the plastically deformed portion 34 come into contact with a main surface of the flat plate T-2, the second spacer Y being sandwiched therebetween. In this case, a heat transport device having a higher strength is obtained, which is preferable.

Then, their respective main surfaces are joined together so that they come into contact with each other.

Figure 15C:
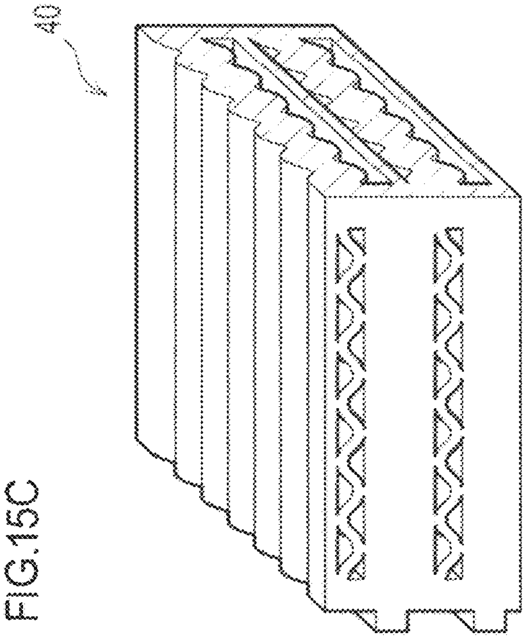
Figure 15A:
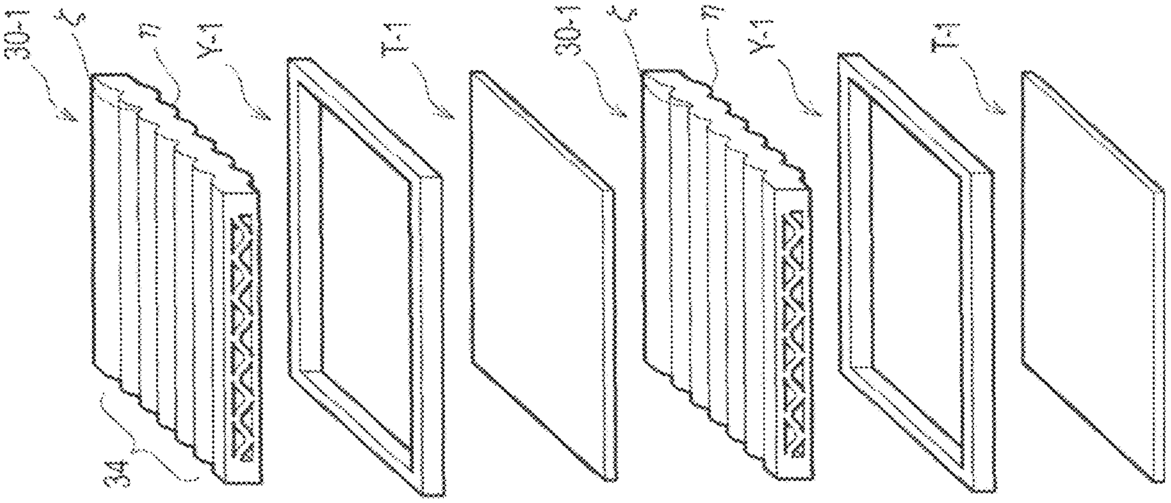
Figure 16:
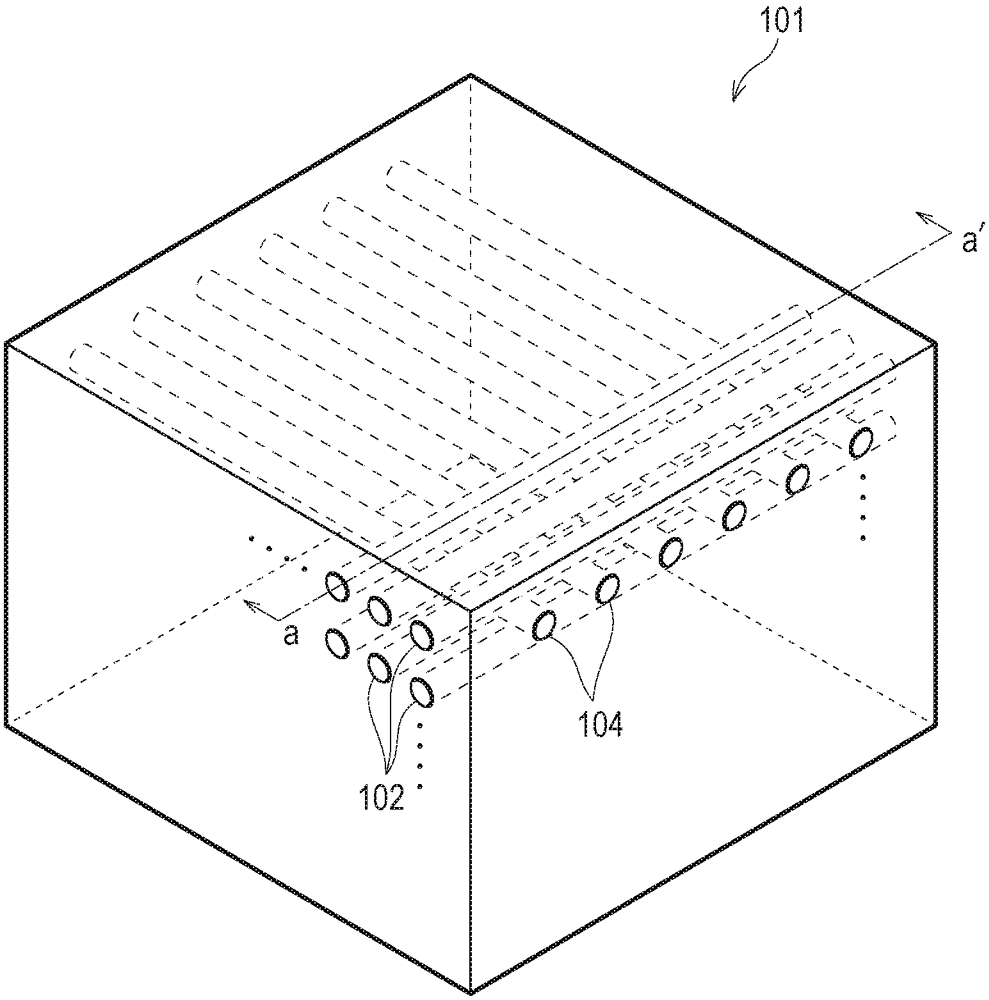
FIG.16 Prior Art
FIG. 16 is a schematic perspective view of a conventional heat exchanger.
Figure 17:
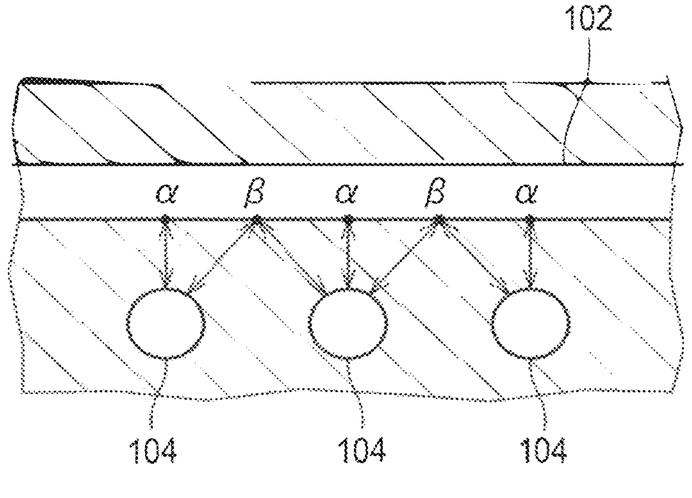
FIG.17 Prior Art
FIG. 17 is a cross-sectional view taken along line a-a' in FIG. 16.

The device 40 of the invention as shown in FIG. 15C can be thus obtained. In FIG. 15C, a right side surface is a cross-section.

In the second joining process, main surfaces of at least one selected from the group consisting of one second flow passage plate and another second flow passage plate; a second flow passage plate and a spacer Y; a second flow passage plate and a flat plate T; and a spacer Y and a flat plate T are preferably joined together by diffusion bonding.

In this case, the obtained heat transport device has thus a higher strength.

What is claimed is:

1. A method of manufacturing a heat transport device, the method comprising:

a flat plate working process including subjecting at least a part of a main surface of a flat plate P to plastic working to form recesses at the main surface, thereby obtaining a processed flat plate Q including in a main surface thereof a processed portion which is a portion having the recesses formed therein;

a first joining process including preparing a flat plate spacer X which is processed so as not to have a portion in contact with the processed portion after a main surface of the spacer is brought into contact with the main surface of the processed flat plate Q, bringing the main surfaces of the processed flat plate Q and the spacer X into contact with each other, sandwiching the spacer X and the processed flat plate Q between a flat upper plate R and a flat lower plate S, and then joining together main surfaces of the flat upper plate R, the processed flat plate Q, the spacer X, and the flat lower plate S so that there is no space between the flat upper plate R and the flat lower plate S in a portion where the processed portion is not present but only the spacer X is present between the flat upper plate R and the flat lower plate S, and first sets of flow passages for flowing a first fluid are formed between the flat upper plate R and the flat lower plate S in a portion where the processed portion is present but the spacer X is not present between the flat upper plate R and the flat lower plate S, thereby obtaining a first flow passage plate;

a plastic working process including subjecting at least a part of a main surface of the first flow passage plate to plastic working so as to deform the first sets of flow passages to form recesses at the main surface, thereby obtaining a second flow passage plate including in a main surface thereof a plastically deformed portion which is a portion having the recesses formed therein; and a second joining process including stacking thus formed second flow passage plates on top of each other and joining together the second flow passage plates so as to bring main surfaces of the second flow passage plates into contact with each other, thus forming, between one second flow passage plate and another second flow passage plate, a second set of flow passages which are not parallel to the first sets of flow passages and where a second fluid is configured to flow.

2. The method of manufacturing a heat transport device according to claim 1, wherein the method comprises, in the second joining process, operations including:

preparing a plurality of flat plate spacers Y each processed so as not to have a portion in contact with the plastically deformed portion after a main surface of the flat plate spacers Y and the main surface of a corresponding second flow passage plate are brought into contact with each other; and stacking a first of the second flow passage plates, a first of the spacers Y, a second of the second flow passage plates, a third of the second flow passage plates, a second of the spacers Y, and a fourth of the second flow passage plates on top of each other in this order; and joining their respective main surfaces together.

3. The method of manufacturing a heat transport device according to claim 1, wherein the method comprises, in the second joining process, operations including:

preparing a plurality of flat plates T;

stacking a first of the second flow passage plates, a first spacer Y, a first of the flat plates T, a second of the second flow passage plates, a second spacer Y, and a second of the flat plates T on top of each other in this order; and joining respective main surfaces thereof together.

4. The method of manufacturing a heat transport device according to claim 1, wherein, in the first joining process, the main surfaces of at least two selected from the group consisting of the flat upper plate R, the processed flat plate Q, the flat lower plate S, and the spacer X are joined together by diffusion bonding.

5. The method of manufacturing a heat transport device according to claim 1, wherein the second joining process comprises diffusion bonding.

* * * * *